(12) United States Patent
Lucarelli

(10) Patent No.: US 11,734,595 B2
(45) Date of Patent: Aug. 22, 2023

(54) APPARATUS AND METHOD FOR SYNTHESIZING QUANTUM CONTROLS

(71) Applicant: The Johns Hopkins University, Baltimore, MD (US)

(72) Inventor: Dennis G. Lucarelli, Takoma Park, MD (US)

(73) Assignee: The Johns Hopkins University, Baltimore, MD (US)

( * ) Notice: Subject to any disclaimer, the term of this patent is extended or adjusted under 35 U.S.C. 154(b) by 939 days.

(21) Appl. No.: 15/668,379

(22) Filed: Aug. 3, 2017

(65) Prior Publication Data

US 2018/0096257 A1   Apr. 5, 2018

Related U.S. Application Data

(60) Provisional application No. 62/403,300, filed on Oct. 3, 2016.

(51) Int. Cl.
*G06N 10/00* (2022.01)
*G05B 19/4155* (2006.01)

(52) U.S. Cl.
CPC ......... *G06N 10/00* (2019.01); *G05B 19/4155* (2013.01); *G05B 2219/39266* (2013.01)

(58) Field of Classification Search
CPC .............. G06N 10/00; G05B 19/4155; G05B 2219/39266
See application file for complete search history.

(56) References Cited

FOREIGN PATENT DOCUMENTS

WO   WO-2015178992 A2 * 11/2015 ............. G06F 15/80

OTHER PUBLICATIONS

D. Hanneke, Realization of a programmable two-qubit quantum processor; Nature Physics vol. 6 Jan. 2010 (Year: 2009).*
Selina Meister, Optimal control theory with arbitrary superpositions of waveforms, Journal of Physics A: Mathematical and Theoretical, Nov. 2014 (Year: 2014).*
Slepian, Some comments on Fourier analysis, uncertainty and modelin, Society for Industrial and Applied Mathematics 1983 (Year: 1983).*
ÉricaJ.C.Gouvêa, "Global optimization using q-gradients, European Journal of Operational Research, vol. 251, Issue 3, 2016, pp. 727-738" (Year: 2016).*
Rommel G. Regis, "The calculus of simplex gradients," Springer-Verlag Berlin Heidelberg 2014 (Year: 2014).*

(Continued)

*Primary Examiner* — Kakali Chaki
*Assistant Examiner* — Su-Ting Chuang
(74) *Attorney, Agent, or Firm* — Todd R. Farnsworth

(57) ABSTRACT

An example method for facilitating the generation of a control field for a quantum system is provided. The example method may include receiving quantum system experiment input parameters and generating a set of coefficients defining a plurality of controls. The plurality of controls may be provided as a weighted sum of basis functions that include discrete prolate spheroidal sequences. The example method may further include applying a gradient based optimization, synthesizing the plurality of controls, and configuring a waveform generator with the plurality of controls to enable the waveform generator to generate the control field.

13 Claims, 9 Drawing Sheets

(56) References Cited

OTHER PUBLICATIONS

Zemen_2005_Time-variant_channel_estimation_using_discrete_prolate_spheroidal_sequences IEEE Transactions on Signal Processing, vol. 53, No. 9, Sep. 2005 (Year: 2005).*
W. Boothby et al., "A Transitivity Problem from Control Theory," Journal of Differential Equations (1975), vol. 17, pp. 296-307.
S. Lloyd, "Almost Any Quantum Logic Gate is Universal," Physical Review Letters (1995), vol. 75, No. 2, pp. 346-349.
S. Economou et al., "Analytical Approach to Swift Nonleaky Entangling Gates in Superconducting Qubits," Physical Review B 91,161405(R) (2015), 5 pages.
Y. Aharonov et al., "Time in the Quantum Theory and the Uncertainty Relation for Time and Energy," Physical Review (1961), vol. 122, No. 5, pp. 1649-1658.
N. Margolus et al.," The Maximum Speed of Dynamical Evolution," Elsevier Science, Physica D (1998), vol. 120, 188-195.
S. Deffner et al., "Quantum Speed Limit for Non-Markovian Dynamics," Physical Review Letters, American Physical Society (2013), PRL 111, 010402, 5 pages.
M.M. Taddei et al., "Quantum Speed Limit for Physical Processes," Physical Review Letters, American Physical Society (2013), PRL 110, 050402, 5 pages.
S. Lloyd et al., "An Information Theoretical Analysis of Quantum Optimal Control," Physical Review Letters, American Physical Society (2014), PRL 113, 010502, 5 pages.
D. Slepian et al., "Prolate Spheroidal Wave Functions, Fourier Analysis and Uncertainty—I," The Bell System Technical Journal (1961), vol. 40, pp. 43-63.
H. Landau et al., "Prolate Spheroidal Wave Functions, Fourier Analysis and Uncertainty—II," The Bell System Technical Journal (1961), vol. 40, pp. 65-84.
N. Khaneja et al., "Optimal control of coupled spin dynamics: design of NMR pulse sequences by gradient ascent algorithms," Elsevier, Journal of Magnetic Resonance (2005), vol. 172, pp. 296-305.
K. Aizu et al., "Parameter Differentiation of Quantum-Mechanical Linear Operators," Journal of Mathematical Physics (1963), vol. 4, No. 6, pp. 762-775.
S. Machnes et al., "Comparing, Optimizing, and Benchmarking Quantum-control Algorithms in a Unifying Programming Framework," American Physical Society, Physical Review Letters A 84, 022305, (2011), 23 pages.
S. Machnes et al., "Gradient Optimization of Analytic Controls: The Route To High Accuracy Quantum Optimal Control," Weizmann Institute of Science, Israel, arXiv:1507.04261v1 (2015), 7 pages, available at: http://arxiv.org/abs/1507.04261v1.
R.H. Byrd et al., "A Limited Memory Algorithm for Bound Constrained Optimization," SIAM Journal on Scientific Computing (1995), Society for Industrial and Applied Mathematics, vol. 16, No. 5, pp. 1190-1208.
J. Johansson et al., "QuTiP: An Open-source Python Framework for The Dynamics of Open Quantum Systems", Elsevier, Computer Physics Communications (2012), vol. 183, pp. 1760-1772.
A. Pitchford et al., "Qutip: Quantum toolbox in python," README.md, available at: https://github.com/qutip/qutip/blob/master/README.md (last accessed Oct. 4, 2017).
J. Zhang et al., "Geometric Theory of Nonlocal Two-qubit Operations," American Physical Society, Physical Review Letters A 67, 042313 (2003), 18 pages.
H. Ball et al., "Walsh-synthesized noise filters for quantum logic," EPJ Quantum Technology, Springer (2015), 45 pages.
L.S. Theis et al., "Simultaneous gates in frequency-crowded multilevel systems using fast, robust, analytic control shapes," Phys. Rev. A 93, 012324 (2016), 13 pages.
T. Caneva et al., "Chopped random-basis quantum optimization," Physical Review A 84, 022326 (2011), 9 pages.
L. Han et al., "Effect of dimensionality on the Nelder-Mead simplex method," Optimization Methods and Software, Taylor & Francis (2006), vol. 21, No. 1, pp. 1-16.
D. Slepian, "Prolate Spheroidal Wave Functions, Fourier Analysis, and Uncertainty—V: The Discrete Case," American Telephone and Telegraph Company, The Bell System Technical Journal (1978), vol. 57, No. 5, pp. 1371-1430.
F. Motzoi et al., "Optimal control methods for rapidly time-varying Hamiltonians," Physical Review A 84, 022307 (2011), 9 pages.
L. Pawela et al., "Quantum control with spectral constraints," Springer, Quantum Inf Process (2014), vol. 13, pp. 227-237.
R. Heeres et al., "Implementing a Universal Gate Set on a Logical Qubit Encoded in an Oscillator," arXiv: 1608.02430 (2016), 16 pages, available at: https://arxiv.org/abs/1608.02430.
R.W. Brockett, "System Theory on Group Manifolds and Coset Spaces," Siam J. Control (1972), vol. 10, No. 2, pp. 265-284.
V. Jurdjevic et al., "Control Systems on Lie Groups," Journal of Differential Equations (1972), vol. 12, pp. 313-329.
P. Watts et al., "Metric Structure of the Space of Two-Qubit Gates, Perfect Entanglers and Quantum Control," Entropy (2013), vol. 15, pp. 1963-1984.
H. Landau et al., "Prolate Spheroidal Wave Functions, Fourier Analysis and Uncertainty—III: The Dimension of the Space of Essentially Time- and Band-Limited Signals," The Bell System Technical Journal (1962), vol. 21, pp. 1295-1336.
D. Slepian, "Prolate Spheroidal Wave Functions, Fourier Analysis and Uncertainty—IV: Extensions to Many Dimensions; Generalized Prolate Spheroidal Functions," The Bell System Technical Journal (1964), vol. 43, pp. 3009-3057.

* cited by examiner

APPARATUS AND METHOD FOR SYNTHESIZING QUANTUM CONTROLS

CROSS-REFERENCE TO RELATED APPLICATIONS

This application claims the benefit of U.S. Provisional Application No. 62/403,300 filed on Oct. 3, 2016, the entire contents of which are hereby incorporated herein by reference.

STATEMENT OF GOVERNMENTAL INTEREST

This invention was made with government support under contract number 2012-12050800010 awarded by Intelligence Advanced Research Projects Activity (IARPA). The government has certain rights in the invention.

TECHNICAL FIELD

Example embodiments generally relate to quantum computing and, more particularly, relate to efficiently defining controls that drive quantum computing.

BACKGROUND

While many of the theoretical principles of quantum computing are well established, the actual implementation of a robust quantum computer and associated environments is still very much evolving. The environment in which a quantum computer performs operations must be defined by a number of parameters, in some instances, for the specific operations and calculations to be performed. Various control parameters may be determined based on a number factors to define the quantum computing environment.

BRIEF SUMMARY OF SOME EXAMPLES

According to some example embodiments, an example apparatus for generating a control field for a quantum system is provided. The example apparatus may comprise digital processing circuitry and a waveform generator configured to generate the control field for a quantum system based on a plurality of controls determined by the digital processing circuitry. In this regard, the digital processing circuitry may be configured to receive quantum system experiment input parameters including a quantum processor model representing the quantum system, and generate a set of coefficients defining a plurality of controls based on the quantum processor model. The plurality of controls may be provided as a weighted sum of basis functions and the basis functions may comprise discrete prolate spheroidal sequences. The processing circuitry may be further configured to apply a gradient based optimization. The gradient may be computed with respect to the coefficients defining the plurality of controls. The processing circuitry may be further configured to synthesize the plurality of controls for provision to the waveform generator to generate the control field for the quantum system.

According to some example embodiments, another apparatus is provided. The example apparatus may comprise digital processing circuitry, and a waveform generator configured to generate a control field for a quantum system. The processing circuitry may be configured to control the waveform generator to generate the control field by supplying a plurality of controls to the waveform generator. The plurality of controls may have been synthesized by applying a gradient based optimization on coeffiecients of a set of basis functions. The basis functions may comprise discrete prolate spheroidal sequences and a complexity of the gradient determination may be based on a bandwidth of a control field of the quantum system.

An example method is also provided according to some example embodiments. The example method may comprise receiving quantum system experiment input parameters including a quantum processor model representing a quantum system, and generating a set of coefficients defining a plurality of controls based on the quantum processor model. The plurality of controls may be provided as a weighted sum of basis functions. The basis functions may comprise discrete prolate spheroidal sequences. The example method may further comprise applying a gradient based optimization, where the gradient is computed with respect to the coefficients defining the plurality of controls. Further, the example method may comprise synthesizing the plurality of controls for provision to a waveform generator to generate the control field for the quantum system, and configuring the waveform generator with the plurality of controls to enable the waveform generator to generate the control field.

BRIEF DESCRIPTION OF THE SEVERAL VIEWS OF THE DRAWING(S)

Having thus described the example embodiments in general terms, reference will now be made to the accompanying drawings, which are not necessarily drawn to scale, and wherein:

DETAILED DESCRIPTION

Figure 1:
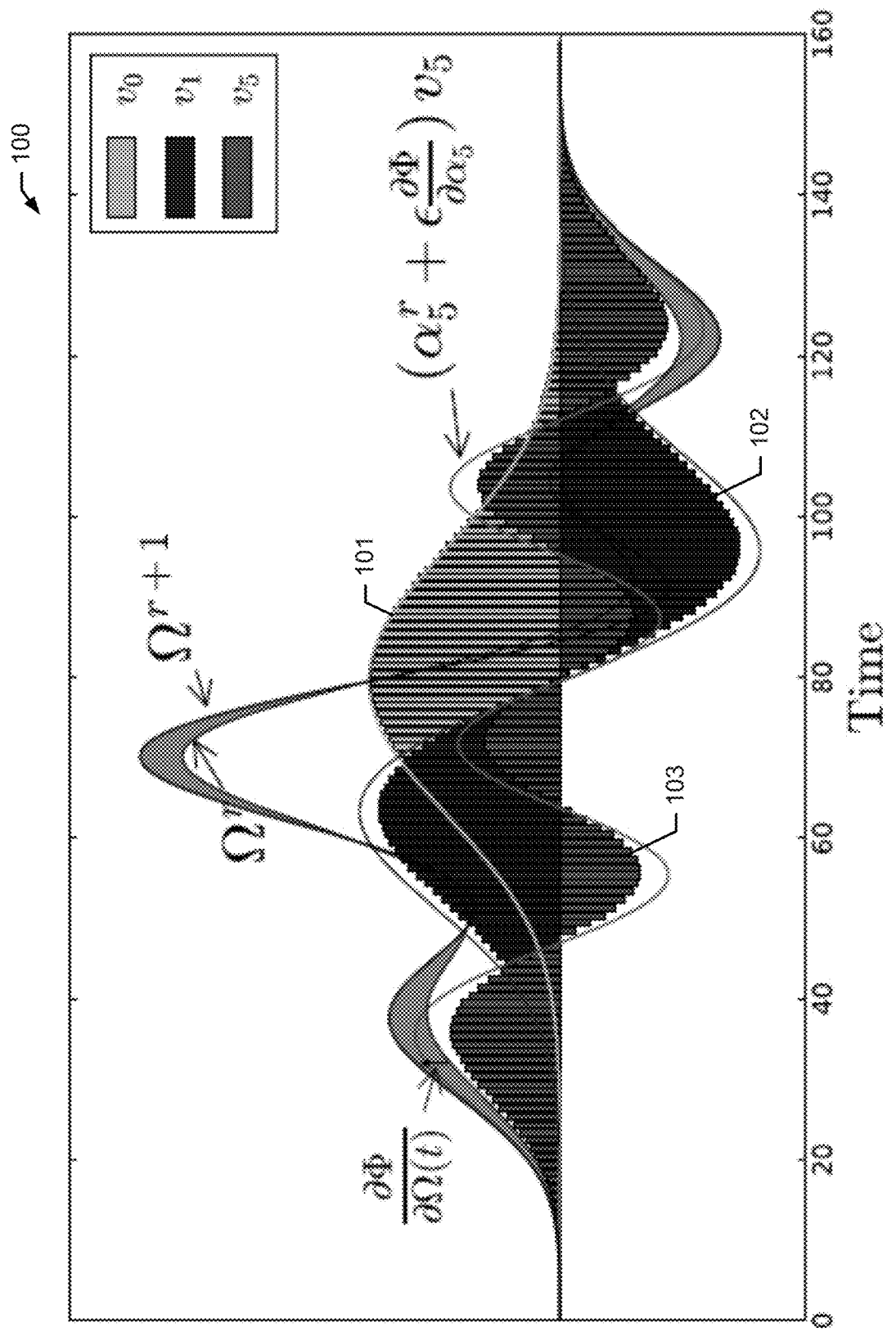
FIG. 1 shows a graph of control iterates of Slepian sequences according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A.

Quantum computing systems are built on the activity of qubits. A qubit in a quantum computing system is the corollary to a bit in binary computing system. Unlike a bit which can only have a value of a zero or a one, a qubit operates in a manner that permits its value to be zero or one, or a superposition between zero and one. It is this characteristic of qubits that give promise to quantum computing systems and their capabilities. The qubit may operate differently based upon how the qubit is being applied in the quantum computing system. To maintain and utilize a qubit for procedures and calculations, a control system can be implemented that outputs a control signal or field to sustain the qubit. Since a qubit is often defined by a characteristic of particle, such as a sub-atomic particle, a field (e.g., optical, radio, magnetic, etc.) is needed to maintain the operation of the qubit for use in procedures and calculations. A control system employing a waveform generator may therefore be used to maintain one or more qubits. However, the field generated by the waveform generator must be carefully defined. To do so, the control system may utilize quantum control parameters (or quantum controls) that are input into the control system to control the waveform generator and the resultant field. Determining these quantum controls for use in a particular quantum application can be cumbersome and complex using conventional techniques. According to some example embodiments, a technique for determining quantum controls is provided that reduces the complexity of the determination process and accounts for real world limitations of hardware used in generating the control field to sustain qubits.

According to some example embodiments, techniques for efficiently synthesizing quantum controls for use in establishing a quantum computing environment are provided. In this regard, to create coherent quantum dynamics a control field must be defined and generated. Depending on the specific implementation of a quantum computer, the control field may be a magnetic field, a radio frequency field, an optical field, or the like, that permits targeted entities to operate in accordance with quantum computing principles. For example, the control field may be defined to permit particles (e.g., subatomic particles such as electrons) to exhibit properties that permit the particles to operate as qubits, which are a fundamental building blocks of a quantum computing system. The control field may be defined at least in part by control parameters, which may be referred to simply as controls. Depending on the type of quantum computing system, the controls may be used by a controller device to set frequencies and intensities of the field (e.g., laser beams for an optical system). Determining quantum controls using conventional techniques, using the pulse area theorem or numerical methods, can prove to be quite complex and violate experimental constraints. Therefore, the real world limitations of hardware that is being used to create and control the quantum computing environment may not be considered.

Quantum control (i.e., the determination and implementation of quantum controls) is necessary to realize the potential computational advantages of the quantum phenomena, such as quantum computing. Given a quantum system, the task of synthesizing quantum controls can involve determining time dependent controls for generating control fields that will operate to realize a desired quantum evolution. According to some example embodiments, a technique can be defined that approaches quantum control synthesis as an optimization problem on the space of allowable controls characterized by a set of basis functions.

In this regard, according to some example embodiments, an example technique may implemented that includes the application of a gradient with respect to coefficients of the set of basis functions that parameterize the control field. By employing the gradient, as described with respect to some example embodiments, the synthesized controls can be highly accurate. Another advantage over conventional approaches, can be that a reduction in the dimension of the underlying optimization problem can be realized. In this regard, for example, consider a system where N is a number of piecewise constant control levels describing the control field for a given operation and M is the number of controls. Using a conventional approach, the size of the optimization problem may be described as N*M. Therefore, as the number of quantum subsystems grows to accommodate larger system designs, N*M may become very large and the control synthesis may become intractable.

However, by introducing, according to some example embodiments, discrete prolate spheroidal sequences, as the basis functions to be operated upon by the gradient, the size of the optimization problem may be reduced. In this regard, the functional gradient determination, with respect to the discrete prolate spheroidal sequences, may result in a size of the optimization being 2*N*M*W, where W is a bandwidth of a control pulse for the quantum system and is generally less than 0.5. As such, the value of W can have a significant impact on the accuracy of the results and the minimum time to construct a desired quantum operation that is defined by the field. In some instances, W is therefore a limitation on the physical system that is considered in this approach. The bandwidth W can vary based on the technology being used to generate the control field. According to some example embodiments, typical values for W may be less than 0.1, relative to the Nyquist band.

According to some example embodiments, a gradient ascent approach and method for optimal synthesis control is provided. In contrast to conventional gradient-based approaches, which optimize the control field independently at every point in time, a gradient of an objective function may be derived with respect to coefficients of a functional basis expansion (i.e., set of basis functions) of the control. Additionally, the space of allowable controls may be limited or restricted to weighted sums of discrete prolate spheroidal sequences (e.g., Slepian sequences) to parameterize the control in terms of the bandwidth, resolution, and evolution time. According to some example embodiments, the approach may approach a bound on a quantum speed limit showing minimum time evolutions scaling with the inverse of the control bandwidth on a representative set of entangling quantum gates.

As mentioned above, function families can play a significant role in quantum mechanics. Some examples may be eigenfunctions of the Schrödinger equation. Elementary examples may include the Hermite polynomials that enter as factors of the wavefunctions of a quantum harmonic oscillator, the Legendre and Laguerre polynomials associated with the spectrum of the hydrogen atom, and, more recently, the Mathieu functions as eigenfunctions to the Cooper pair box Hamiltonian.

In the context of quantum information, functional analytic methods have been employed for quantum control, parameterizing the space of allowable controls and reducing the search space for optimal synthesis. Conventional results include the numerical determination of dynamically corrected gates using Walsh functions, the use of Hanning windows as a basis for frequency selective control of superconducting qubit devices, and the control protocol that uses randomized basis functions to parameterize the controls. These conventional methods may numerically locate optimal controls using a Nelder-Mead simplex method on the basis function coefficients. However, such simplex based search methods generally scale poorly with the dimension of the unknown parameter, thereby limiting the number of basis functions in the expansion of the control and the complexity of solutions amenable with these conventional approaches.

According to some example embodiments, an alternative technique, referred to as Gradient Ascent in Function Space (GRAFS), is provided that leverages gradient ascent solvers on basis function coefficients, enabling the use of a potentially large and complete set of basis functions. Such a gradient based optimization technique, while converging only to a local maximum, may scale well with problem size dimension (e.g., the underlying optimization problem is smaller by more than a half).

In addition to deriving a modified gradient expression, the role of control bandwidth in quantum control problems may be considered and incorporated into the method. Constraints on the control bandwidth can arise from practical considerations of experimental procedures and classical control electronics and are present in qubit systems. With a focus on bandwidth, discrete prolate spheroidal sequences may be considered, which are commonly referred to as the Slepian sequences, as a basis for piece-wise constant controls. The finite length sequences may accurately and efficiently represent the space of band limited signals and can serve as the basis functions for parameterizing quantum controls. Given experimental constraints that can be imposed on quantum controls, conventional methods have been proposed to account for the effects of band limited, bounded control in optimal control synthesis. However, these conventional methods may introduce a penalty on the derivative of a control term in the control objective function, a Fourier cut-off constraint or a band-limiting filter in the control protocol iterates. Note that the conventional methods are a workaround and that band limiting in this way is not intrinsic to the problem. According to some example embodiments, a gradient approach as described herein, with the aid of the Slepian sequences, may constrain the space of controls a priori to produce an intrinsic control solution without additional terms in the objective function or post hoc bandlimiting.

Closed quantum control systems may be conveniently represented as control systems on Lie groups from which a number of properties can be inferred. In particular, the Lie algebra rank condition (LARC), determined by the Lie algebra spanned by repeated commutators of the internal (or drift) Hamiltonian and the control Hamiltonians, can be used to determine the reachability of a quantum system. The reachability condition may ensure the existence of controls that can reach any point in state space and may be a generic condition for systems evolving on (compact) Lie groups. The LARC, however, may not lead to a constructive procedure for determining the controls required to drive the system to a desired element of the Lie group. As such, this control synthesis problem may require a solution to a two-point boundary value problem and can be solved analytically by pulse area theorems or in other special cases. For more general, complex control situations, numerical methods from optimal control theory may be necessary.

Fundamental limits on the evolution time of a quantum system may be stated as quantum speed limits (QSL). These bounds may be geometric restatements of the time-energy uncertainty relation for time independent systems and may be generalized to time-dependent, driven quantum systems. The set of quantum states reachable in polynomial time with bounded controls may be characterized and an associated bound may be derived relating the control bandwidth, final state accuracy, and minimum achievable evolution time. The time-bandwidth QSL is appealing because higher bandwidth controls can drive a quantum system to a target state at a faster rate. According to some example embodiments, the gradient method described herein may consider this bound and thus may demonstrate a control synthesis that elucidates the limits of bounded, bandlimited control.

The space of time bandlimited sequences can now be considered. The time-bandwidth uncertainty relation may govern the concentration properties of classical signals. In the limiting case, a relation may be observed by a pure tone with infinite time extent and vanishing spectral measure. Motivated by problems in communications technology, where all signals are manifestly both time limited and bandlimited, a theory of bandlimited functions has been developed by seeking an engineering compromise to the uncertainty relation. These functions are characterized by maximizing the fraction of a signal's energy in a time interval while enforcing a bandlimiting constraint. The solution to this optimization problem was aided by the discovery of a differential operator that simultaneously commutes with time and bandlimiting operators. The form of this commuting operator may be related to the wave equation in prolate spheroidal coordinates, thus christening the resulting functions as the prolate spheroidal wave functions (PSWF).

From a control perspective, it may be useful to consider the discrete analogues to the PSWF, which are the discrete prolate spheroidal sequences or simply the Slepian sequences. For a sequence of length N and half bandwidth W, the Slepian sequences, $v^k(N,W)$ can be defined as real solutions to the eigenvalue problem $$\sum_{m=0}^{N-1} \frac{\sin 2\pi W(n-m)}{\pi(n-m)} v_m^k(N, W) = \lambda_k(N, W) v_l^k(N, W) \quad (1)$$

where k, l∈{0, 1, ..., N−1} and $v_l^k(N,W)$ is the l-th element of k-th order Slepian. The eigenvalues $\lambda_k(N,W)$ can be shown to be a measure of sepctral concentration and ordered such that $1 \geq \lambda_0(N,W) \geq \lambda_1(N,W) \geq \ldots \geq \lambda_N(N,W)$ and have a property that the first 2NW eigenvalues are near unity, while the remaining eigenvalues are close to 0. This property of the Slepian sequences may be used to establish an approximate dimension of the space of bandlimited sequences of length N to be 2NW. Moreover, the order k, for the sequence $v^k(N,W)$, may indicate the even/odd symmetry of the sequence with respect to its midpoint and its number of zero-crossings. In accordance with some example embodiments, weighted sums of Slepian sequences can be identified as piecewise constant controls by specifying a sequence length N, a half bandwidth parameter W∈(0, 0.5] and a pulse duration $\mathcal{T}$. The pair (N, $\mathcal{T}$) may then define a control resolution Δt, the Nyquist frequency, and W may be expressed in hertz.

Quantum optimal control and gradient ascent may now be considered in function space. For a closed, finite dimensional quantum system, the state dependence of the Schrödinger equation may be removed and dynamics may be equivalently lifted to a differential equation on the space of special unitary matrices U∈SU(d) that act on the d-dimensional Hilbert space of quantum states. In this representation, the quantum control system may be given by $$\dot{U}(t) = -\frac{i}{\hbar}\left(H_d + \sum_{j=1}^{M} \Omega_j(t)H_j\right)U(t) \quad (2)$$

where $H_d$ is the time-independent drift Hamiltonian and the $H_j$ are the control Hamiltonians that capture coupling of the qubits to an externally applied control field. The controlled Hamiltonian with drift may be denoted as $$H_\Omega(t) = H_d + \sum_{j=1}^{M} \Omega_j(t)H_j$$

The solution to equation (2) may account for non-commuting operators $[H_\Omega(t_l), H_\Omega(t_k)] \neq 0$ for $k \neq l$ and may be formally given by the time-ordered integral $$U_\tau(\Omega) = T\exp\left[-\frac{i}{\hbar}\int_0^\tau H_\Omega(t)dt\right] \quad (3)$$

With initial conditions given by an identity matrix, $U_0=1$, the solution of equation (2) simply propagates the state by matrix-vector multiplication $\psi_\mathcal{T} = U_\mathcal{T} \cdot \psi_0$.

A quantum gate synthesis problem may involve determining control functions $\{\Omega_j(t)\}_{j=1}^M$ that generate a desired target unitary $U_{targ}$ at some time $\mathcal{T}$. Optimal control may define an objective function that is optimized subject to a dynamical constraint and initial and final conditions on the state of the system. In quantum gate synthesis, this methodology may be employed to determine control fields that minimize trace distance from a target unitary while evolving according to the Schrödinger equation (2). The optimal control objective function may take several forms depending on the control task and may require a fidelity measure, $\mathcal{F}$, to be maximized. A common choice may be the (global) phase invariant distance to the target unitary at the at the final time $\mathcal{T}$ $$\Phi(\mathcal{F}(\Omega)) = \frac{1}{d}|\mathcal{F}(\Omega)| \quad (4)$$

normalized by the dimension of the system, d, with the fidelity measure)

$$\mathcal{F}(\Omega) = tr[U_{targ}^\dagger \cdot U_\mathcal{T}(\Omega)] \quad (5)$$

First order optimality conditions, known as Pontrayagin's maximum principle (PMP), are well established but, in general, result in a system of nonlinear differential equations that must be solved for optimal control synthesis. A Gradient Ascent Pulse Engineering algorithm (GRAPE) has been developed to numerically solve the optimal control problem that simplifies the optimization problem by iteratively updating the control fields by small steps in the gradient direction of the objective function at each time-step of the control. The pulse shaping iterates are of the form $$\Omega_j^r(t_\ell) = \Omega_j^{r-1}(t_\ell) + \epsilon \frac{\partial \Phi(\Omega^{r-1})}{\partial \Omega_j(t_\ell)} \quad (6)$$

with r denoting an iteration index and the increment $\epsilon$ being chosen by line search. While consistent with the PMP, GRAPE may derive its algorithmic simplicity by removing any explicit constraints on the control in the objective function. For a system without integral constraints on the controls, the PMP conditions may result in trivial co-state dynamics, simplifying the first order necessary conditions and ensuring that gradient ascent updates are sufficient for convergence to a local maximum.

Assuming a discretization of the controls into N equal $\Delta t$ length segments with total pulse duration, $\mathcal{T} = N\Delta t$, the GRAPE algorithm may proceed by using the product of exponentials $$U_\tau \approx e^{-\frac{i\Delta t}{\hbar}H_\Omega(t_N)} e^{-\frac{i\Delta t}{\hbar}H_\Omega(t_{N-1})} \ldots e^{-\frac{i\Delta t}{\hbar}H_\Omega(t_1)} \quad (7)$$

as an approximation to the time-ordered integral equation (3) and the exact diagonalization formula for parameter differentiation of the matrix exponential $$\frac{d}{ds}e^{A+sB} \quad (8)$$

define the notation $$U_{k;l} = U(t_k) \ldots U(t_l) \quad (9)$$

for matrix products of the form of equation (7). The expression for the partial derivative of the objective function by the j-th control at time $t_l = l\Delta t$ may be given by the chain rule $$\frac{\partial \Phi(\Omega)}{\partial \Omega(t_\ell)} = \frac{1}{d}\text{Re}\left[e^{-i\arg(\mathcal{F})}tr\left[U_{targ}^\dagger \cdot U_{N:\ell+1}\frac{\partial U(t_\ell)}{\partial \Omega(t_\ell)}U_{\ell-1:1}\right]\right] \quad (10)$$

where arg (•) denotes the phase of a complex number.

In contrast to updating the controls at each time-step, the GRAFS technique may first expresse the controls in a functional basis expansion and exploit the observation that the gradient of the trace fidelity with respect to the basis function coefficients may be an application of the product rule on the matrix products defining the approximate propagator. The update rules are depicted in FIG. 1, with a difference being that variations of the basis function coefficients may globally affect the control field over all times, whereas GRAPE updates affect each time-step independently. In this reagrd, FIG. 1 depicts a graphical representaion 100 of GRAPE and GRAFS control iterates. GRAPE may update the control at each time-step, while GRAFS may increment the basis function coefficient and affects the control at all times. Slepian sequences, $v_k$, are shown in FIG. 1 for k=0, 1, and 5. In this regard, $v_0$ is shown at 101, $v_1$ is shown at 102, and $v_5$ is shown at 103.

According to some example embodiments, the controls may be formally expressed as weighted sums of length N piecewise constant sequences $v_i(t)$ $$\Omega_j(t_\ell) = \sum_{k=0}^{K} \alpha_{kj} v_k(t_\ell) \quad (11)$$

with real coefficients $\alpha_{kj}$. Applying the product rule to the matrix product defining the trace fidelity and setting h=1, the gradient expression may be given by $$\frac{\partial \mathcal{F}}{\partial \alpha_{kj}} = \sum_{\ell=1}^{N} tr\left[U_{targ}^\dagger U_{N:\ell+1} \frac{\partial U(t_\ell)}{\partial \alpha_{kj}} U_{\ell-1:1}\right] \quad (12)$$

where $$\frac{\partial U(t_\ell)}{\partial \alpha_{kj}} = \frac{\partial \exp[-i\Delta t H_\Omega(t_\ell) - i\alpha_{kj}\Delta t v_k(t_\ell) H_j]}{\partial \alpha_{kj}} \quad (13)$$

is of the form of equation (8) with $A=-i\Delta t H_\Omega(t_\ell)$, $B=-i\Delta t v_k(t_\ell)H_j$ and $s=\alpha_{kj}$.

While this approach and method may be applicable to any set of basis functions, the simulations in the following have been performed with controls expressed as weighted sums of Slepian sequences. With $\mathcal{A}$ denoting the matrix of coefficients so that ($\mathcal{A}_{kj}=\alpha_{kj}$ and the basis functions arranged as columns of the N×2NW matrix $\mathcal{V}$, the gradient ascent iterations in matrix form may be given by $$\Omega^\tau = \mathcal{V} \cdot \left(\mathcal{A}^{r-1} + \epsilon \frac{\partial \Phi(\mathcal{A})}{\partial \mathcal{A}^{r-1}}\right) \quad (14)$$

An advantage of GRAFS may be that control constraints are enforced a priori, through the use of basis functions, while still employing the gradient ascent procedure. Since arbitrary pulse shapes can often be accurately represented by a small set of basis functions, GRAFS may also construct a more efficient optimization problem. In the case of Slepian parameterized controls, 2NW sequences approximately characterize the space of bandlimited sequences. For a system with M controls, this results in an unknown parameter vector of dimension 2NWM for GRAFS, compared to NM for GRAPE. Since W is less than 0.5 and often is much less, a significant reduction in dimensionality of the underlying optimization problem may be realized. Note that little additional computational effort may be required to perform the partial derivatives of equation (13) with an exact diagonalization method, since the partials can be computed with the $H_j$'s only and the scalars $v_i(t_\ell)$ can be inserted during the summation loop of equation (12). Further, the GRAFS approach and method, according to some example embodiments, with its simple product rule based gradient, may be optimized with well known gradient solvers such as the limited memory Broyden-Fletcher-Goldfarb-Shannon (L-BFGS) algorithm.

An illustrative example of the technique, according to some example embodiments, is given by the following notional quantum control system. Suppose the control task is to construct a three qubit Toffoli (or controlled-controlled-not) gate from Heisenberg exchange operators and two independent controls. The Heisenberg exchange may be denoted on qubits i and j as $H_x^{ij}$ and a single qubit control may be denoted on qubit k as $\sigma^k$. The system Hamiltonian may be given by $$H_\Omega = H_x^{12} + H_x^{23} + \Omega_x(t)\sigma_x^1 + \Omega_y(t)\sigma_y^3 \quad (15)$$

Figure 2:
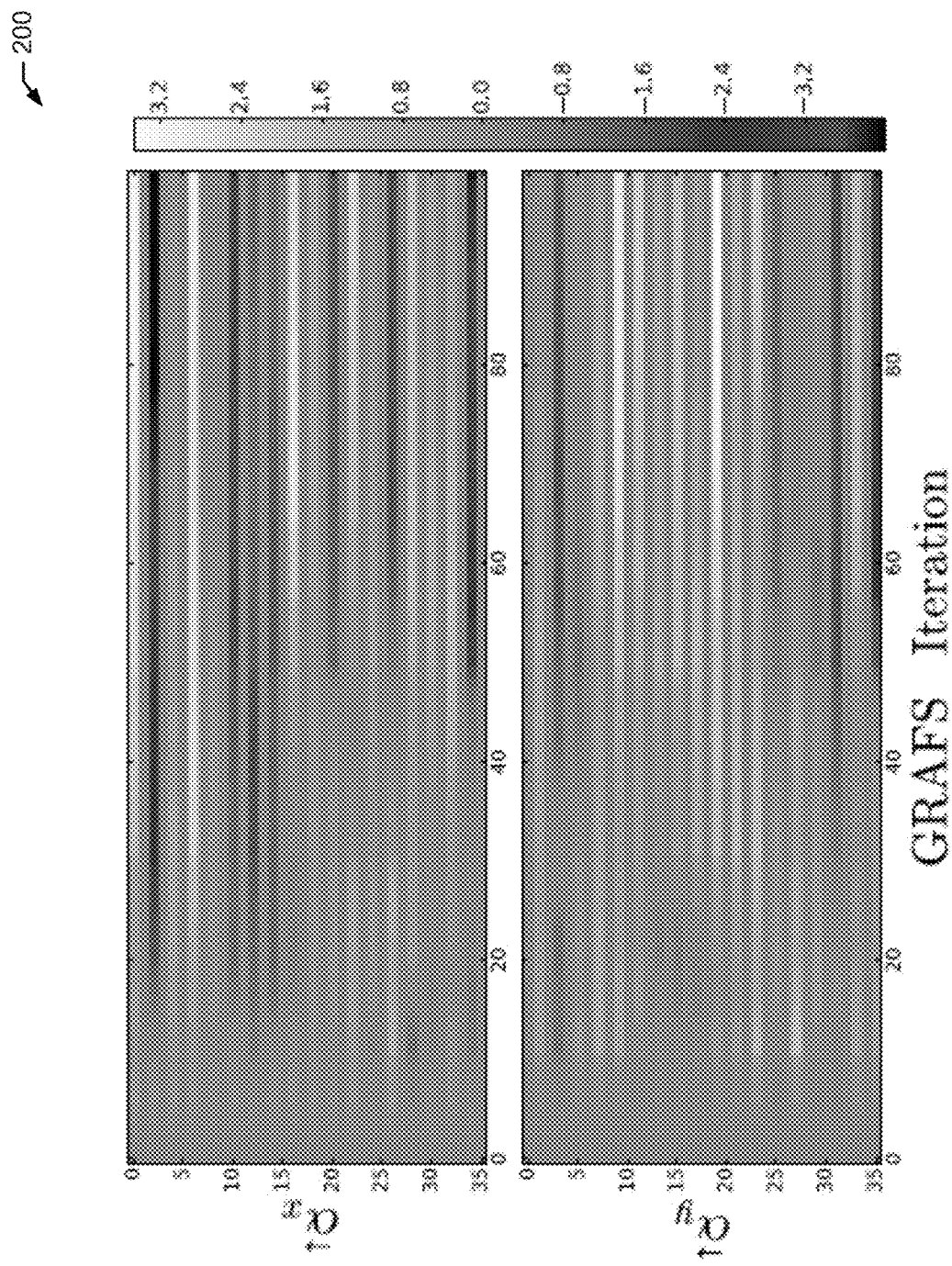
FIG. 2 shows a graph of a result of repeated iterations of a GRAFS algorithm according to an example embodiment.
Figure 3:
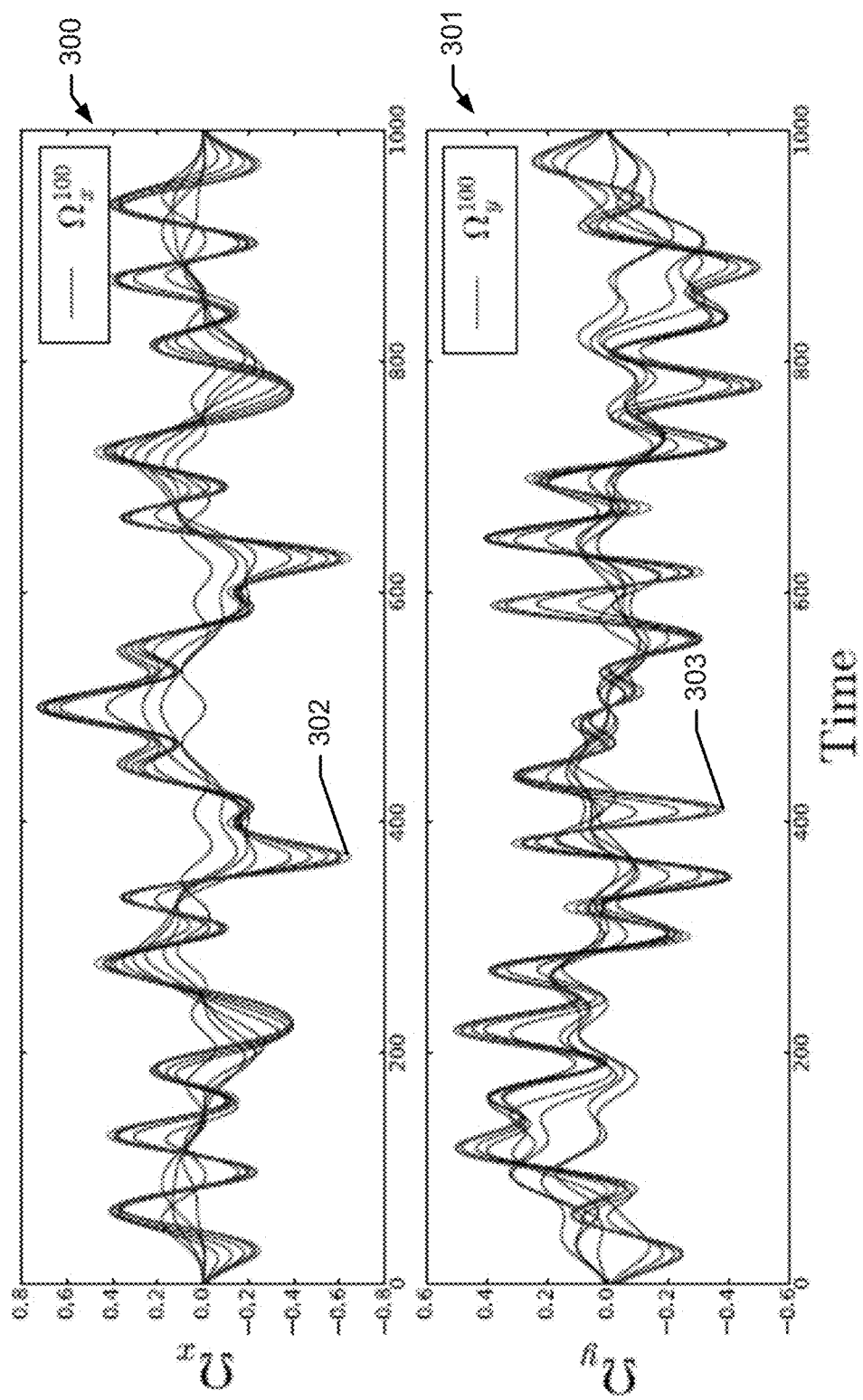
FIG. 3 shows a graph of pulse shaping iterations according to an example embodiment.

FIG. 2 shows a graphical rendering 200 an optimization trajectory of 100 iterations of the GRAFS algorithm using the L-BFGS algorithm to impose inequality constraints on the basis function weights ($|\alpha_{kj}|>5.0$) and perform line search to calculate $\epsilon$ in the gradient update of equation (14). FIG. 3 shows graphs 300, 301 of 10 pulse shaping iterations where $\Omega_j^r = \mathcal{V} \cdot \vec{\alpha}_j^r$ and where the graphs based on this formula can be aggregated to form a pulse shape as indicated at 302 and 303, respectively. In this regard, controls were formed with a Slepian basis expansion with parameters N=1000 and W=0.02. Initial conditions for the coefficients for were set zero. With these parameters, there are 40 Slepian sequences. Higher-order Slepians hold less spectral concentration and can have non-zero initial and final points. According to some example embodiments, these sequences may be removed leaving a final set of 36 sequences for pulse shaping. Simulations may be performed with the optimal control module in Qutip by modifying the gradient calculation to equation (12) and the update equation to equation (14).

Figure 4:
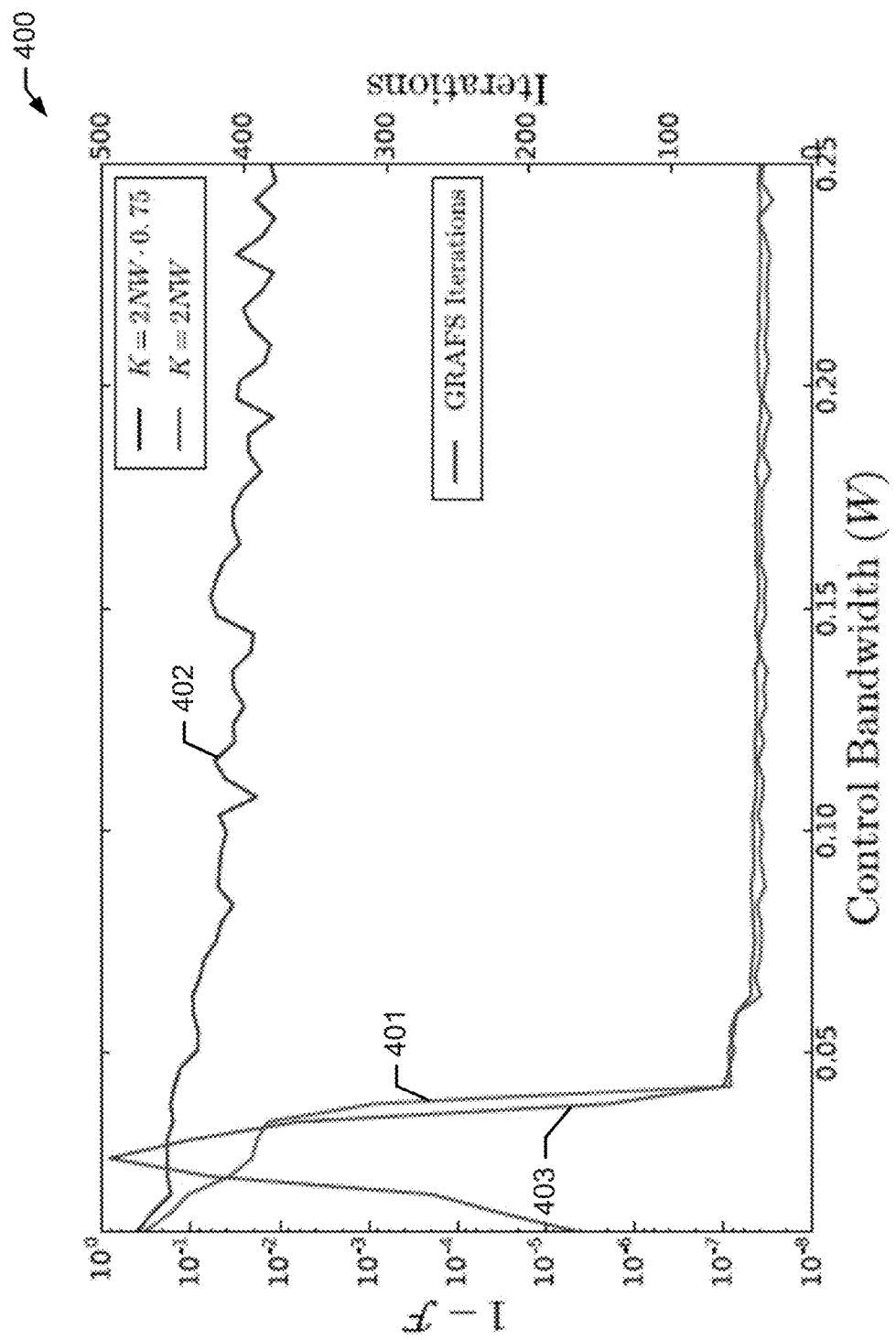
FIG. 4 shows a graph of infidelity as a function of bandwidth and number of Slepian sequences according to an example embodiment.
Figure 5:
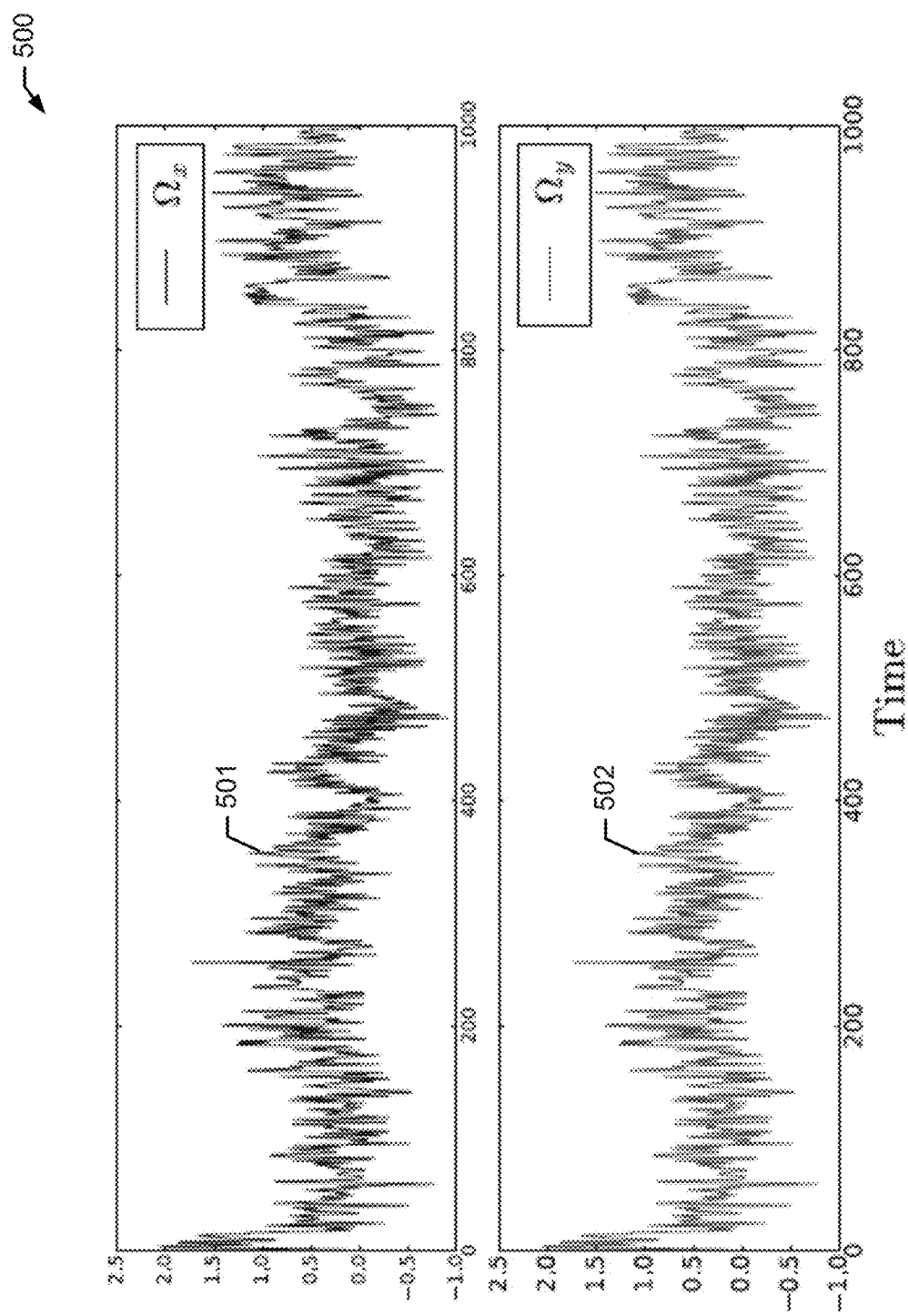
FIG. 5 shows a graph of high bandwidth controls according to an example embodiment.

Controls constructed from high bandwidth Slepian sequences may contain more control authority and thus result in synthesis of quantum gates with sufficient accuracy (fidelity) to execute fault-tolerant. FIG. 4 provides confirmation of this intuition and also shows the importance of using a nearly complete set of K=2NW Slepian sequences in the basis function expansion of the control. In this reagrd, K=2NW Slepian sequences is shown at 401 and K=2NW*0.75 Slepian sequences is shown at 402. FIG. 4 shows a graph 400 of infidelity as a function of bandwidth (W) and number of Slepian sequences (K). Also shown in FIG. 4 is the number of GRAFS iterations to convergence at 403. According to some example embodiments, by varying the bandwidth and running the GRAFS procedure with the system of equation (15), high fidelity Toffoli gates may be generated across the entire bandwidth range (W∈[0.01, 0.25] shown) when using relatively high numbers of available sequences (e.g., more than three quarters). As shown in FIG. 4, convergence of the algorithm, as determined by the norm of the gradient getting small ($10^{-9}$), also scales with the bandwidth of the control. Graphs 500 of high bandwidth controls 501 and 502, constructed from a Slepian basis with N=1000, W=0.4 and the GRAFS method, are shown in FIG. 5. These physically unrealizable controls approach the bang-bang limit and demonstrate how the Slepian sequences, with their continuous bandwidth parameter, represent the full space of controls.

With respect to the time-bandwidth quantum speed limit, a time-bandwidth relation may be utilized by considering the QSL for time-dependent open quantum systems $$\tau_{QSL} \geq \frac{\delta}{\frac{1}{\tau}\int_0^\tau \|H_\Omega(t)\|_p dt} \quad (16)$$

where $\delta$ is an accuracy measure and $\|\cdot\|_p$ is the matrix p-norm. For mixed state transfer from $p_0$ to $p_f$ the accuracy measure may be given in terms of the Bures angle $$\delta = \sin^2\left(\arccos\sqrt{tr\left[\sqrt{\rho_0}\,\rho_f\sqrt{\rho_0}\right]}\right).$$

Restricting the space of allowable controls to the Slepian sequences and assuming closed, unitary dynamics and setting p=2, a bound on the denominator of equation (16) may be derived. Considering a single control Hamiltonian $H_c$, no drift term and denoting $$\overline{H}_\Omega = \frac{1}{\tau} \int_0^\tau \|H_\Omega(t)\|_2$$

and $\alpha = \max_i\{\alpha_i\}$ the following string of inequalities can be obtained $$\overline{H}_\Omega \leq \frac{1}{\tau} \sum_{i=1}^{2NW} \int_0^\tau \|\alpha_i v_i(t) H_c\|_2 \qquad (17)$$

$$\leq \frac{1}{\tau} \|\alpha H_c\|_2 \sum_{i=1}^{2NW} \int_0^\tau |v_i(t)| dt \qquad (18)$$

$$\leq \frac{1}{\tau} \|\alpha H_c\|_2 \sum_{i=1}^{2NW} \sum_{k=1}^{N} |v_i(t_\ell)| \Delta t \qquad (19)$$

$$\leq \frac{1}{\tau} \|\alpha H_c\|_2 \sum_{i=1}^{2NW} \sqrt{N} \Delta t \|v_i\|_2 \qquad (20)$$

$$= \frac{1}{\tau} \|\alpha H_c\|_2 \sqrt{N} \Delta t 2NW \qquad (21)$$

since $\|v_i\|_1 > \sqrt{N} \|v_i\|_2$ and the Slepian sequences are normalized in two-norm. Setting $|\alpha| = \|H_c\|_2 = 1$ and since $\mathcal{T} = N\Delta t$, a time-bandwidth QSL $$\mathcal{T}_{QSL}(2\sqrt{N}W) \geq \delta \qquad (22)$$

may be easily recovered.

A series of numerical experiments were performed to qualitatively assess the $\mathcal{T}_{QSL} \geq \mathcal{O}(\delta_B/W)$ scaling by running the GRAFS procedure repeatedly to determine the minimal time to achieve a specified fidelity given by the distance measure $\delta = \Phi(\mathcal{F})$. In these experiments, 200 target unitaries were constructed by random sampling parameters defining two-qubit gates via the Cartan (or canonical) decomposition. In particular, a tuple (cx, cy, cz) is sampled from theWeyl chamber to form the target $$U_{targ} = K_1 \exp\left(\frac{i}{2}(c_x\sigma_x\sigma_x + c_y\sigma_y\sigma_y + c_z\sigma_z\sigma_z)\right) K_2 \qquad (23)$$

with randomly generated local operations $K_i \in SU(2) \otimes SU(2)$. To further constrain the set of target gates, the tuples may be formed by rejection sampling from the Weyl chamber to obtain parameters from the 7-faced polyhedron defining parameters for so-called perfect entanglers. These are the two-qubit unitaries capable of generating maximally entangled states from an initial product state. This class of unitaries may contain the well known quantum logic gates such as the CNOT and $\sqrt{SWAP}$.

GRAFS was used to determine controls for this set of target gates while varying the control bandwidth and keeping all other parameters, $\max^i\{|\alpha_i|\} = 1$ and N=200, fixed. The two-qubit Hamiltonian system with 4 independent controls may be given by $$H_\chi^{12} + \sum_{i=1}^{2} \Omega_x^i(t)\sigma_x^i + \Omega_y^i(t)\sigma_y^i \qquad (24)$$

Figure 6:
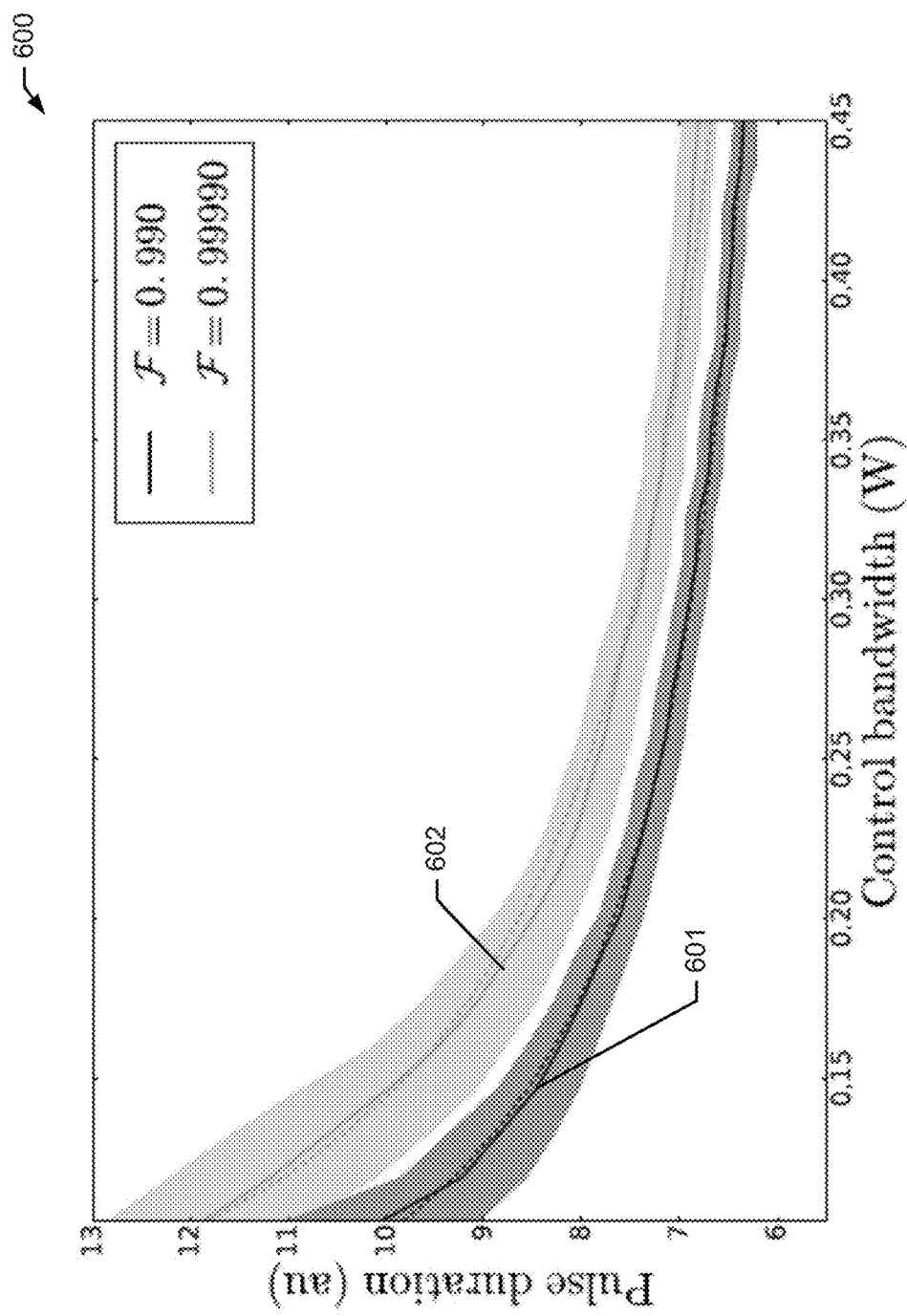
FIG. 6 shows a graph of controls with a varying bandwidth according to an example embodiment.

A bracketing procedure, requiring multiple runs of the algorithm for each target gate, was used to estimate a minimal pulse duration for a given set of parameters and desired fidelity. The results in the form of a graph 600 are shown in FIG. 6 with the mean of minimal times shown by the solid curve, and the empirical quantum speed limit scaling for $\mathcal{F}_2 = 0.990$ at 601 and $\mathcal{F}_4 = 0.99990$ at 602. The dashed lines are curve fits of the form $$\frac{a}{W} + b$$

showing good agreement with the mean. The filled region marks the variance of minimal times across all samples. Some variance of minimal times is to be expected even when restricting the target set to the perfect entanglers. It is known that the curvature of the SU(4) manifold can distort the volume elements (Haar measure) throughout the Weyl chamber, effectively making some target unitaries farther from the initial identity matrix. From FIG. 6, it can be seen that the minimal time evolutions follow the time-bandwidth QSL scaling and demonstrate that Slepian based GRAFS not only recovers the bound of time-bandwidth QSL, but also gives a constructive procedure for realizing the bound.

Accordingly, the Slepian sequences, with a continuously varying bandwidth parameter, may therefore efficiently represent the space of bandlimited controls. A gradient expression on the coefficients of a basis function expansion of the control may therefore be derived and shown to accurately and efficiently determine optimal controls. Time optimal evolutions were numerically investigated and minimal pulse durations were shown to scale with the inverse of the control bandwidth. As quantum optimal control is increasingly applied, GRAFS can be a useful technique for synthesizing bandlimited timeoptimal controls.

Figure 7:
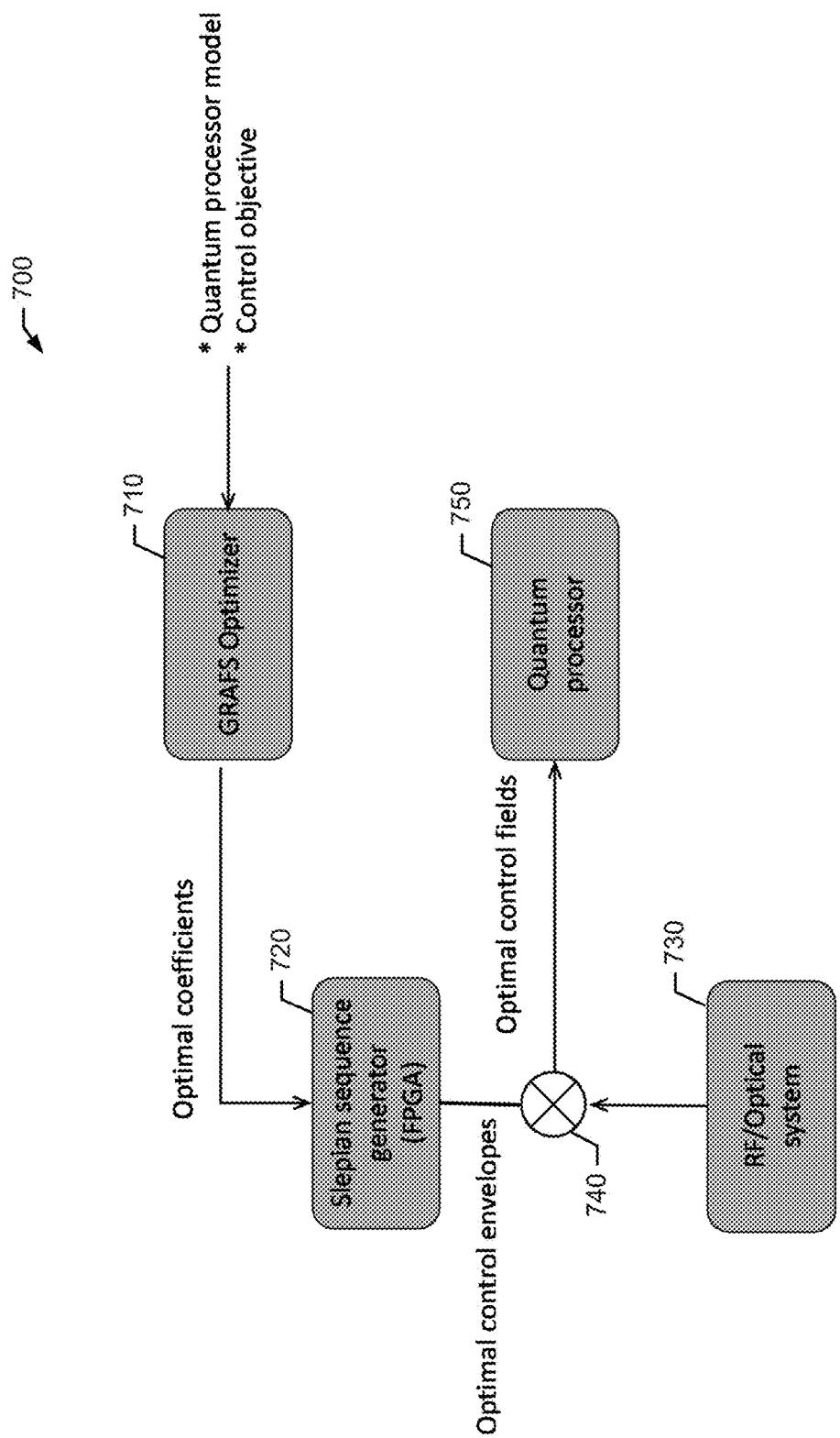
FIG. 7 shows a block diagram of a control synthesis and control field generation system for a quantum processor according to an example embodiment.

In view of the forgoing, FIG. 7 shows an example system 700 configured to synthesize quantum controls and utilize those controls to operate a quantum processor of a quantum computer. In this regard, the system 700 may comprise a GRAFS optimizer 710, a Slepian sequence generator 720, an RF/Optical system 730, a combiner 740, and a quantum processor 750.

According to some example embodiments, the GRAFS optimizer 710 may be implemented on digital processing circuitry similar to the digital processing circuitry 810 described below. The GRAFS optimizer 710 may be configured to receive and consider a quantum processor model and a control objective, and generate optimal coefficients by applying a gradient to basis functions in accordance with the GRAFS approach provided above.

The Slepian sequence generator 720 may also be implemented on digital processing circuitry similar to the digital processing circuitry 810 described below. In this regard, the Slepian sequence generator 720 may be configured to determine the Slepian sequences and apply the optimal coefficients provided by the GRAFS optimizer 710 to synthesize controls in the form of optimal control envelopes.

Within the context of a quantum system, the optimal control envelopes may be combined, via the combiner 740, with an RF/Optical system 730 to generate the optimal control fields for the quantum processor 750. The RF/Optical system 730 may be a waveform generator capable of creating RF or optical fields to be used as the optimal control fields by the quantum processor 750. The quantum processor 750 may utilize the control fields to perform quantum operations using qubits that are programmed via the optimal control fields.

Figure 8:
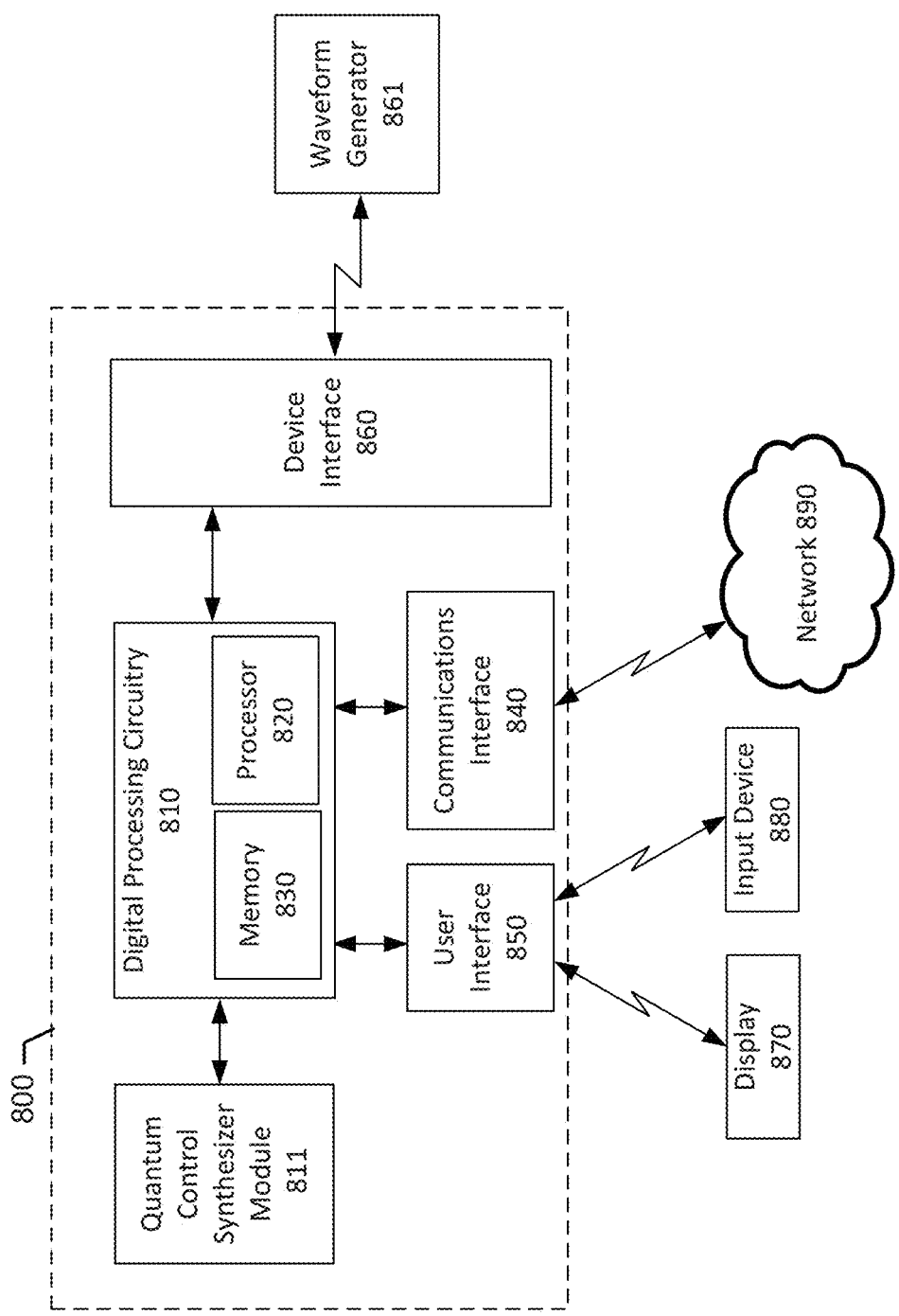
FIG. 8 shows an example apparatus for quantum control synthesis according to an example embodiment.

FIG. 8 provides an example of an apparatus 800 configured to synthesize quantum controls according to some example embodiments. The apparatus 800 may be configured to synthesize quantum controls as described above and otherwise herein.

Accordingly, FIG. 8 shows block diagrams of some internal components of an apparatus 800 that comprises processing circuitry 810 that may be in operative communication with or embody quantum control synthesizer module 811, a communications interface 840, a user interface 850, and a device interface 860. The processing circuitry 810 may be digital processing circuitry that leverages binary state bits to perform operations (unlike a quantum system that utilizes qubits). The processing circuitry 810 may interact with or embody a memory 830 and a processor 820. The quantum control synthesizer module 811 may include or otherwise be in communication with processing circuitry 810 that is configurable to perform operations in accordance with example embodiments described herein. In this regard, the processing circuitry 810 may be configured to perform computational processing and memory management according to an example embodiment. In some embodiments, the processing circuitry 810 may be embodied as a chip or chip set. In other words, the processing circuitry 810 may comprise one or more physical packages (e.g., chips) including materials, components or wires on a structural assembly (e.g., a baseboard). The processing circuitry 810 may be configured to receive inputs (e.g., via peripheral components including the memory 830), perform actions based on the inputs, and generate outputs (e.g., for provision to peripheral components). In an example embodiment, the processing circuitry 810 may include one or more instances of a processor 820, associated circuitry, and memory 830. As such, the processing circuitry 810 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 830 may include one or more non-transitory memory devices such as, for example, volatile or non-volatile memory that may be either fixed or removable. The memory 830 may be configured to store information, data, applications, instructions or the like for enabling, for example, quantum control synthesizer module 811 to carry out various functions in accordance with exemplary embodiments. For example, the memory 830 could be configured to buffer input data for processing by the processing circuitry 810. Additionally or alternatively, the memory 830 could be configured to store instructions for execution by the processing circuitry 810. Among the contents of the memory 830, applications may be stored for execution by the processing circuitry 810 in order to carry out the functionality associated with each respective application. In some cases, the applications may include directions associated with the quantum control synthesizer module 811.

As mentioned above, the processing circuitry 810 may be embodied in a number of different ways. For example, the processing circuitry 810 may be embodied as various processing means such as one or more processors 820 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 810 may be configured to execute instructions stored in the memory 830 or otherwise accessible to the processing circuitry 810. As such, whether configured by hardware or by a combination of hardware and software, the processing circuitry 810 may represent an entity (e.g., physically embodied in circuitry—in the form of processing circuitry 810) capable of performing operations according to example embodiments while configured accordingly. Thus, for example, when the processing circuitry 810 is embodied as an ASIC, FPGA, or the like, the processing circuitry 810 may be specifically configured hardware for conducting the operations described herein. Alternatively, as another example, when the processing circuitry 810 is embodied as an executor of software instructions, the instructions may specifically configure the processing circuitry 810 to perform the operations described herein.

The communication interface 840 may include one or more interface mechanisms for enabling communication with other devices external to apparatus 800, via, for example, a network 890, such as a local area network. In some cases, the communication interface 840 may be any means such as a device or circuitry embodied in either hardware, or a combination of hardware and software that is configured to receive or transmit data from/to devices in communication with the processing circuitry 810.

The user interface 850 may be controlled by the processing circuitry 810 to interact with a user. In this regard, via the user interface 850, the processing circuitry 810 may be configured to output to a user by, for example, driving a display 870 and receiving input from a user via the input device 880, which may be a keyboard, mouse, touch screen, camera, or the like.

The device interface 860 may be configured to interface with typically special purpose devices that are closely controlled (possibly via firmware) by the processing circuitry 810. In this regard, the device interface 860 may include a data bus that devices may be connected to for interaction with the processing circuitry 810. Via the device interface 860, the processing circuitry 810 may send control messages or output information to a device, and the processing circuitry 810 may receive circumstantial information from devices that may, at least in part, modify the operation of processing circuitry 810 based on the circumstantial information.

According to some example embodiments, the apparatus 800 may be operably coupled to a waveform generator 861. The waveform generator 861 may be configured to generate a wave or field, such as an RF, magnetic, or optical field, for use in a quantum system as described herein. In this regard, the processing circuitry 810 may be configured to synthesize controls to be output to the waveform generator 861 for use in generating a control field for a quantum system. In this regard, the waveform generator 861, according to some example embodiments, may be configured to generate a control field for a quantum system. According to some example embodiments, the waveform generator 861 may be configured to output, for example, a sequence of electromagnetic pulses or a pulse train as the control field. The control field may be generated by a resonator circuit. With reference to FIG. 7, according to some example embodiments, the waveform generator 861 may be comprised of, for example, RF/Optical system 730 and the combiner 740, which may support the operation of a quantum processor, such as quantum processor 750. Accordingly, the waveform generator 861 may be configured to generate a control field for a quantum system based on a plurality of controls determined by digital processing circuitry.

In an example embodiment, the processing circuitry 810 may be embodied as, include or otherwise control, the quantum control synthesizer module 811. As such, in some embodiments, the processing circuitry 810 may be said to cause each of the operations described in connection with, for example, the GRAFS optimizer 710, the Slepian sequence generator 720, and otherwise described herein with respect to the synthesis of quantum controls. The quantum control synthesizer module 811 may therefore undertake the corresponding functionalities responsive to execution of instructions or algorithms configuring the processing circuitry 810 accordingly. The processing circuitry 810 may provide programmable control signals, selections, and the like to control the operation of the apparatus 800 in accordance with quantum control synthesizer module 811 responsive to execution of instructions stored in the memory 830.

The quantum control synthesizer module 811 may be embodied in hardware of the processing circuitry 810 or embodied in the hardware of the processing circuitry as configured by instructions stored in the memory 830. In this regard, the quantum control synthesizer module 811 may be configured to receive quantum system experiment input parameters including a quantum processor model representing the quantum system, and generate a set of coefficients defining a plurality of controls based on the quantum processor model. The plurality of controls may be provided as a weighted sum of basis functions, and the basis functions may comprise discrete prolate spheroidal sequences. The quantum control synthesizer module 811 may also be configured to apply a gradient based optimization. The gradient may be computed with respect to the coefficients defining the plurality of controls. The quantum control synthesizer module 811 may be further configured to synthesize the plurality of controls for provision to the waveform generator 861 to generate the control field for the quantum system.

According to some example embodiments, the quantum control synthesizer module 811 is configured to control the waveform generator 861 to generate the control field by supplying a plurality of controls to the waveform generator 861. In this regard, the plurality of controls may have been synthesized by applying a gradient based optimization on coeffiecients of a set of basis functions. The basis functions may comprise discrete prolate spheroidal sequences and a complexity of the gradient determination is based on a bandwidth of a control field of the quantum system.

According to some example embodiments, the quantum control synthesizer module 811 may be further configured to determine a number of discrete prolate spheroidal sequences based on a sequence length and the bandwidth, or remove discrete prolate spheroidal sequences having non-zero initial and final points. The quantum control synthesizer module 811 may, according to some example embodiments, be further configured to synthesize the plurality of controls as a functional basis expression by applying a product rule to matrix products to define an approximate propagator. According to some example embodiments, the quantum control synthesizer module 811 may be further configured to synthesize the plurality of controls to be weighted sums of piecewise constant sequences of a given length or generate the plurality of controls to be weighted sums of Slepian sequences. According to some example embodiments, the gradient may be used with an optimization algorithm such as the limited memory Broyden-Flethcer-Goldfarb-Shannon (L-BFGS) algorithm. In some example embodiments, the quantum control synthesizer module 811 may be further configured to synthesize the plurality of controls within a limited bandwidth and above a minimum state change time to obtain threshold state accuracy. Further, the quantum control synthesizer module 811 may be configured to provide the plurality of quantum controls to a wave generator (e.g., waveform generator 861) that uses the plurality of controls to generate the control field for the quantum system.

Figure 9:
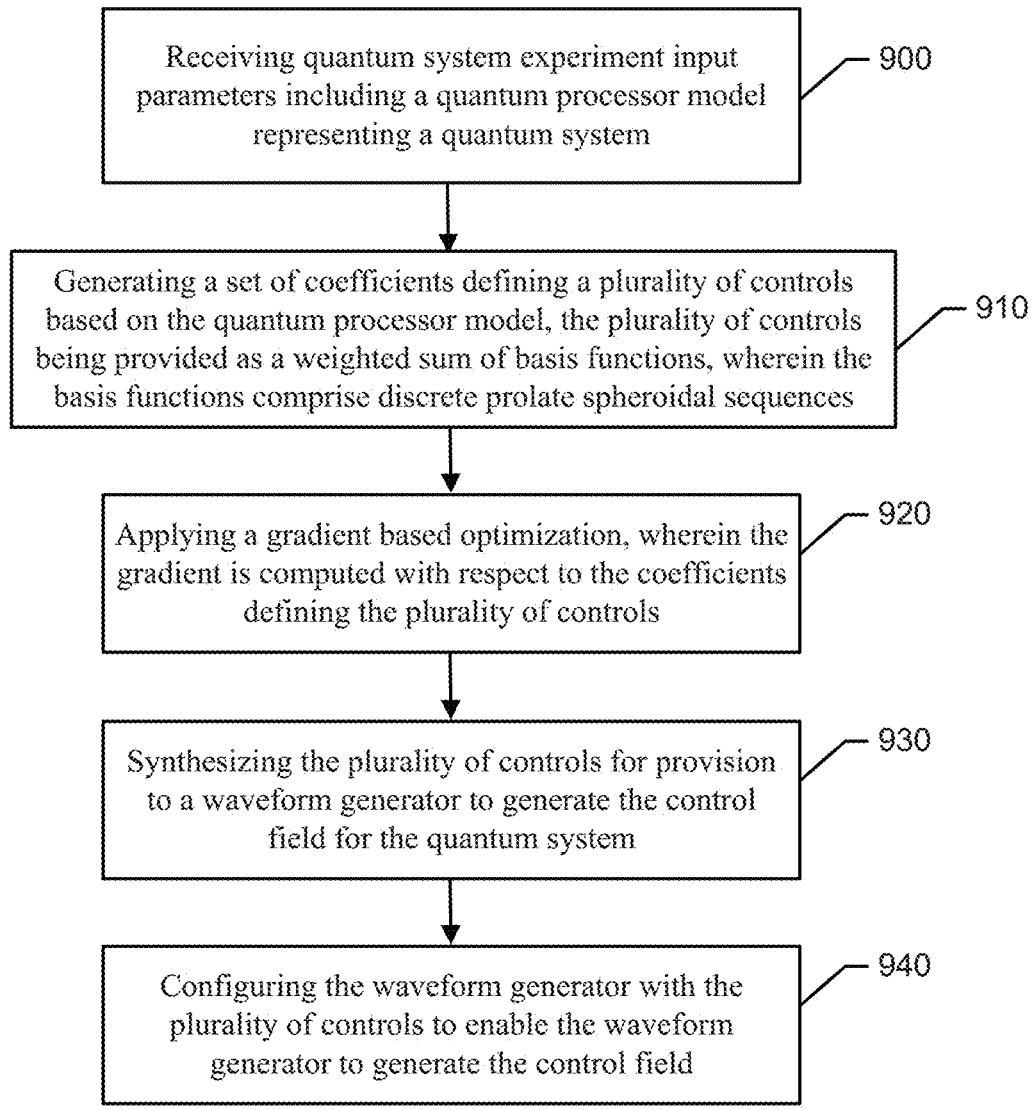
FIG. 9 shows an example method for quantum control synthesis according to an example embodiment.

Referring now to FIG. 9, a block diagram of an example method for facilitating generation of a control field for a quantum system by, for example, the apparatus 800 is provided. The example method may include, at 900, receiving quantum system experiment input parameters including a quantum processor model representing a quantum system, and, at 910, generating a set of coefficients defining a plurality of controls based on the quantum processor model. The plurality of controls may be provided as a weighted sum of basis functions, and the basis functions may comprise discrete prolate spheroidal sequences. The example method may further comprise, at 920, applying a gradient based optimization, where the gradient is computed with respect to the coefficients defining the plurality of controls. Further, at 930, the example method may comprise synthesizing the plurality of controls for provision to a waveform generator to generate the control field for the quantum system, and, at 940, configuring the waveform generator with the plurality of controls to enable the waveform generator to generate the control field.

According to some example embodiments, the example method may further comprise determining a number of discrete prolate spheroidal sequences based on a sequence length and a bandwidth, or removing discrete prolate spheroidal sequences having non-zero initial and final points. The example method may, according to some example embodiments, further include synthesizing the controls as a functional basis expression by applying a product rule to matrix products to define an approximate propagator, or synthesizing the plurality of controls to be weighted sums of piecewise constant sequences of a given length. According to some example embodiments, the example method may also include synthesizing the plurality of controls to be weighted sums of Slepian sequences. Further, according to some example embodiments, the gradient may comprises a limited memory Broyden-Flethcer-Goldfarb-Shannon (L-BFGS) algorithm. The example method may further include synthesizing the plurality of controls within a limited bandwidth and above a minimum state change time to obtain threshold state accuracy.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such example is described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus for generating a control field for a quantum system comprising:
   digital processing circuitry; and
   a waveform generator configured to generate the control field for the quantum system based on a plurality of controls determined by the digital processing circuitry;
   wherein the digital processing circuitry is configured to:
   receive quantum system experiment input parameters including a quantum processor model representing the quantum system;
   generate, based on the quantum system experiment input parameters, a set of coefficients for basis functions as a functional basis expansion, wherein the basis functions comprise discrete prolate spheroidal sequences, wherein the set of coefficients for the basis functions are generated and optimized via application of a gradient ascent solver using an iterative approach for gradient ascent by determining a gradient of trace fidelity via application of a product rule on matrix products of the coefficients to iteratively modify the set of coefficients, based on update rules, across all times until convergence at a local maximum, and wherein generation of the set of coefficients for the basis functions has an optimization size of 2*N*M*W, where N is a number of piecewise constant control levels for the control field, M is a number of controls in the plurality of controls, and W is a bandwidth of a control pulse for the quantum system;
   synthesize the plurality of controls based on the set of coefficients, wherein the digital processing circuitry is configured to synthesize each control within the plurality of controls to be a piecewise constant control that is a weighted sum of the basis functions with the set of coefficient applied to the basis functions; and
   provide the plurality of controls to the waveform generator to generate the control field for the quantum system.

2. The apparatus of claim 1, wherein the discrete prolate spheroidal sequences are Slepian sequences.

3. The apparatus of claim 1, wherein the digital processing circuitry is configured to determine a set of discrete prolate spheroidal sequences based on a sequence length and control hardware bandwidth constraints.

4. The apparatus of claim 1, wherein the gradient ascent solver comprises a limited memory Broyden-Flethcer-Goldfarb-Shannon (L-BFGS) algorithm.

5. The apparatus of claim 1, wherein the digital processing circuitry is further configured to synthesize the plurality of controls within a limited bandwidth and above a minimum state change time to obtain threshold state accuracy.

6. An apparatus comprising:
   digital processing circuitry; and
   a waveform generator configured to generate a control field for a quantum system;
   wherein the processing circuitry is configured to control the waveform generator to generate the control field by supplying a plurality of controls to the waveform generator;
   wherein the plurality of controls have been synthesized based on a set of coefficients for basis functions as a functional basis expansion, the set of coefficients of the basis functions having been generated and optimized via application of a gradient ascent solver using an iterative approach for gradient ascent by determining a gradient of trace fidelity via application of a product rule on matrix products of the coefficients to iteratively modify the set of coefficients, based on update rules, across all times until convergence at a local maximum, wherein the basis functions comprise discrete prolate spheroidal sequences that operate as constraints on the plurality of controls, wherein a complexity of the gradient ascent solver is based on a bandwidth of a control field of the quantum system, wherein each control within the plurality of controls is synthesized to be a piecewise constant control that is a weighted sum of the basis functions with the set of coefficient applied to the basis functions, and wherein generation of the set of coefficients for the basis functions has an optimization size of 2*N*M*W, where N is a number of piecewise constant control levels for the control field, M is a number of controls in the plurality of controls, and W is a bandwidth of a control pulse for the quantum system.

7. The apparatus of claim 6, wherein the waveform generator is configured to generate the control field to support implementation of a quantum gate within the quantum system.

8. A method comprising:
receiving quantum system experiment input parameters including a quantum processor model representing a quantum system;
generating, based on the quantum system experiment input parameters, a set of coefficients for basis functions as a functional basis expansion, wherein the basis functions comprise discrete prolate spheroidal sequences, wherein the set of coefficients of the basis functions are generated and optimized via application of a gradient ascent solver using an iterative approach for gradient ascent by determining a gradient of trace fidelity via application of a product rule on matrix products of the coefficients to iteratively modify the set of coefficients, based on update rules, across all times until convergence at a local maximum;
synthesizing a plurality of controls based on the set of coefficients, wherein each control within the plurality of controls is synthesized to be a piecewise constant control that is a weighted sum of the basis functions with the set of coefficient applied to the basis functions;
providing, to a waveform generator, the plurality of controls to generate a control field for the quantum system, wherein generation of the set of coefficients for the basis functions has an optimization size of 2*N*M*W, where N is a number of piecewise constant control levels for the control field, M is a number of controls in the plurality of controls, and W is a bandwidth of a control pulse for the quantum system; and
configuring the waveform generator with the plurality of controls to enable the waveform generator to generate the control field.

9. The method of claim 8, wherein the discrete prolate spheroidal sequences are Slepian sequences.

10. The method of claim 8, further comprising determining a set of discrete prolate spheroidal sequences based on a sequence length and control hardware bandwidth constraints.

11. The method of claim 8, further comprising removing discrete prolate spheroidal sequences having non-zero initial and final points.

12. The method of claim 8, wherein the gradient ascent solver comprises a limited memory Broyden-Flethcer-Goldfarb-Shannon (L-BFGS) algorithm.

13. The method of claim 8, further comprising synthesizing the plurality of controls within a limited bandwidth and above a minimum state change time to obtain threshold state accuracy.

* * * * *